(12) United States Patent
Soh et al.

(10) Patent No.: US 7,573,918 B1
(45) Date of Patent: Aug. 11, 2009

(54) DISPERSION COMPENSATED MODE-LOCKED PULSED LASERS AND OPTICAL AMPLIFIERS

(75) Inventors: Daniel Beom Soo Soh, Sunnyvale, CA (US); Tony Hong Lin, Palo Alto, CA (US)

(73) Assignee: Calmar Optcom, Inc., Sunnyvale, CA (US)

( * ) Notice: Subject to any disclaimer, the term of this patent is extended or adjusted under 35 U.S.C. 154(b) by 13 days.

(21) Appl. No.: 11/835,301

(22) Filed: Aug. 7, 2007

Related U.S. Application Data

(60) Provisional application No. 60/835,993, filed on Aug. 7, 2006.

(51) Int. Cl.
*H01S 3/10* (2006.01)

(52) U.S. Cl. .............. 372/9; 372/18; 372/92; 372/97; 372/100; 372/102; 385/36; 385/37; 385/31; 385/122; 385/123

(58) Field of Classification Search .......... 372/9, 372/18, 92, 97, 98, 100; 385/36, 37, 122, 385/123; 359/337, 337.5, 333, 337.11, 340, 359/341.1, 831, 838
See application file for complete search history.

(56) References Cited

U.S. PATENT DOCUMENTS

| | | | | |
|---|---|---|---|---|
| 3,961,841 A * | 6/1976 | Giordmaine | ................ | 359/264 |
| 5,469,454 A * | 11/1995 | Delfyett, Jr. | ................ | 372/18 |
| 5,499,261 A * | 3/1996 | Welch et al. | ............. | 372/50.11 |
| 5,550,850 A * | 8/1996 | Lee et al. | ...................... | 372/16 |
| 6,795,479 B2 * | 9/2004 | Yokoyama | ................... | 372/97 |
| 7,088,756 B2 * | 8/2006 | Fermann et al. | ........ | 372/45.013 |
| 7,103,076 B2 * | 9/2006 | Kitaoka et al. | ................ | 372/25 |
| 7,116,848 B2 * | 10/2006 | He et al. | ....................... | 385/11 |
| 7,190,705 B2 * | 3/2007 | Fermann et al. | ................ | 372/18 |
| 7,254,293 B1 * | 8/2007 | Helkey et al. | ................. | 385/18 |
| 7,414,779 B2 * | 8/2008 | Huber et al. | ................ | 359/333 |

OTHER PUBLICATIONS

E. Treacy, "Optical pulse compression with diffraction gratings", Quantum Electronics, IEEE Journal of, (1969).
O. G. Okhotnikov, L. Gomes, N. Xiang, T. Jouhti, and A. B. Grudinin, "Mode-locked ytterbium fiber laser tunable in the 980-1070-nm spectral range," Opt. Lett. 28, 1522-1524 (2003).
Nielsen, C.K., Jespersen, K.G., Keiding, S.R., "A 158 fs 5.3 nJ fiber-laser system at 1 mu m using photonic bandgap fibers for dispersion control and pulse compression," Optical Soc Amer, vol. 14, issue: 13, 6063-6068 (2006).
M. Hofer, M. H. Ober, R. Hofer, M. E. Fermann, G. Sucha, D. Harter, K. Sugden, I. Bennion, C. A. C. Mendonca, and T. H. Chiu, "High-power neodymium soliton fiber laser that uses a chirped fiber grating," Opt. Lett. 20, 1701- (1995).
L. Lefort, J. H. V. Price, D. J. Richardson, G. J. Spüler, R. Paschotta, U. Keller, A. R. Fry, and J. Weston, "Practical low-noise stretched-pulse Yb3+-doped fiber laser," Opt. Lett. 27, 291-293 (2002).

* cited by examiner

*Primary Examiner*—Minsun Harvey
*Assistant Examiner*—Delma R Forde
(74) *Attorney, Agent, or Firm*—Fish & Richardson P.C.

(57) ABSTRACT

Techniques, apparatus and systems for providing compensation mechanisms for mode-locked lasers and optical amplifiers and a dispersion compensation mechanism to allow a mode-locked laser and an optical amplifier to be optically coupled to each other and to share a common diffraction grating for a dispersion compensation element for the laser and a separate dispersion compensation element for the amplifier.

38 Claims, 7 Drawing Sheets

DISPERSION COMPENSATED MODE-LOCKED PULSED LASERS AND OPTICAL AMPLIFIERS

PRIORITY CLAIM

This application claims the benefits of U.S. Provisional Application No. 60/835,993 entitled "Wavelength-tunable mode-locked master-oscillator power-amplifier fiber laser using normally dispersive fibers and a single shared diffraction grating" and filed on Aug. 7, 2006 by Daniel Beom Soo Soh and Tony Lin. The entire disclosure of the Application No. 60/835,993 is incorporated by reference as part of specification of this application.

BACKGROUND

This application relates to lasers including mode-locked lasers.

Wavelength-tunable femtosecond pulsed fiber lasers around the 1 µm wavelength region provide a promising alternative to Titanium:Sapphire lasers operating in the same spectral region in part because of the compact size, good stability, and maintenance free operation of such pulsed fiber lasers. Advances in optical power amplifier technology based on Yb-doped cladding-pumped fibers allow for the power scaling capability of the femtosecond pulsed fiber lasers at 1 µm to well match or even exceed that of Titanium:Sapphire lasers and other laser technologies. For example, high power Yb-doped fiber amplifiers reaching an average output power up to several hundred watts are now commercially available and can be used to amplify output of wavelength-tunable femtosecond pulsed fiber lasers.

One technical issue associated with pulsed fiber lasers and optical amplifiers based on doped fiber gain media is optical dispersion which causes undesired pulse broadening.

SUMMARY

This application discloses dispersion compensation mechanisms for mode-locked lasers and optical amplifiers and provides a dispersion compensation mechanism to allow a mode-locked laser and an optical amplifier to be optically coupled to each other and to share a common diffraction grating for a dispersion compensation element for the laser and a separate dispersion compensation element for the amplifier.

In one implementation, an optical device is described to include a Fabry-Perot resonator comprising a first optical reflector, a reflective diffraction grating, a first prism, and a second optical reflector. The diffraction grating and the first prism are located in an optical path between the first and second optical reflectors to direct light from the first optical reflector to the second optical resonator and vice versa, and the diffraction grating is positioned to direct light from the first optical reflector at a first location on the diffraction grating to the first prism and the first prism reflects the light back to a second location on the diffraction grating which directs the reflected light from the first prism to the second reflector which is oriented to reflect the light back to the diffraction grating to retrace an optical path from the first optical reflector to the second optical reflector via the diffraction grating and the first prism. This optical device also includes an optical saturable absorber unit located in the optical path between the first and second optical reflectors of the Fabry-Perot resonator and a first optical gain medium located in the optical path between the first and second optical reflectors of the Fabry-Perot resonator. The optical grain medium absorbs pump light at a pump wavelength to emit laser light at a laser wavelength different from the pump wavelength and produces an optical gain at the laser wavelength. This optical device further includes a first optical coupler located in the optical path between the first and second optical reflectors of the Fabry-Perot resonator to couple the pump light into the Fabry-Perot resonator to cause the optical gain medium to emit the laser light; a second optical coupler located in the optical path between the first and second optical reflectors of the Fabry-Perot resonator to couple a portion of the laser light in the Fabry-Perot resonator out of the Fabry-Perot resonator as a laser output beam; an optical amplifier placed in an optical path of the laser output beam to amplify power of the laser output beam; an optical element to direct the laser output beam from the optical amplifier to the diffraction grating which directs the laser output beam along a first optical path; and a second prism located in the first optical path to receive the laser output beam from the diffraction grating. The second prism is operable in combination with the diffraction grating and the second optical reflector to direct the laser output beam, sequentially, from the second prism to the diffraction grating, from the diffraction grating to the second optical reflector, from the second optical reflector to the diffraction grating, from the diffraction grating to the second prism, from the second prism to the diffraction grating which further directs the laser output beam along a second optical path.

In another implementation, a method for compensating optical dispersion in light is described to include directing light into a first location of a reflective diffractive optical grating to reflect the light; using a prism spaced from the reflective diffractive optical grating, to receive the reflected light from the diffractive optical grating and to reflect the received light back to a second location on the diffractive optical grating; and using a reflector to reflect the light reflected from the diffractive optical grating at the second location back to the second location on the reflector to direct the light to the prism and back to the diffractive optical grating to produce output light which has reduced dispersion.

In another implementation, an optical device is described to include a Fabry-Perot resonator comprising a first optical reflector, a reflective diffraction grating, a first prism, and a second optical reflector. The diffraction grating and the first prism are located in an optical path between the first and second optical reflectors to direct light from the first optical reflector to the second optical resonator and vice versa, and The diffraction grating is positioned to direct light from the first optical reflector at a first location on the diffraction grating to the first prism and the first prism reflects the light back to a second location on the diffraction grating which directs the reflected light from the first prism to the second reflector which is oriented to reflect the light back to the diffraction grating to retrace an optical path from the first optical reflector to the second optical reflector via the diffraction grating and the first prism. This optical device includes an optical mode locking unit located in the optical path between the first and second optical reflectors of the Fabry-Perot resonator to provide a mode locking mechanism and a first optical gain medium located in the optical path between the first and second optical reflectors of the Fabry-Perot resonator. The optical grain medium absorbs pump light at a pump wavelength to emit laser light at a laser wavelength different from the pump wavelength and produces an optical gain at the laser wavelength. This optical device also includes a first optical coupler located in the optical path between the first and second optical reflectors of the Fabry-Perot resonator to couple the pump light into the Fabry-Perot resonator to cause the optical gain medium to emit the laser light; and a second optical coupler located in the optical path between the first and second optical reflectors of the Fabry-Perot resonator to couple a portion of the laser light in the Fabry-Perot resonator out of the Fabry-Perot resonator as a laser output beam. The optical mode locking unit may be a saturable absorber to provide passive mode locking or an externally controlled optical modulator to provide active mode locking.

In yet another implementation, an optical device is described to include an optical amplifier placed in an optical path of a laser beam to amplify power of the laser beam; a reflective diffraction grating positioned to receive the laser beam from the optical amplifier and to reflect, at a first location of the reflective diffraction grating, the received laser beam along a first optical path; an optical reflector placed in an optical path of the laser beam reflected from the reflective diffraction grating to reflect the laser beam back to the reflective diffraction grating; and a prism located in the first optical path to receive the laser beam reflected from the diffraction grating. The prism is operable in combination with the diffraction grating and the optical reflector to direct the laser beam, sequentially, from the prism to a second location on the diffraction grating, from the diffraction grating to the optical reflector, from the optical reflector to the diffraction grating, from the diffraction grating to the prism, from the prism to the diffraction grating which further directs the laser beam along a second optical path with a reduced level of dispersion in comparison with the laser beam output by the optical amplifier.

In yet another implementation, a method for providing dispersion compensation in both a mode-locked laser and an optical amplifier for the mode-locked laser is described to include directing a laser output beam from a mode-locked laser to pass through an optical amplifier to amplify the laser output beam and to produce an amplified laser beam; using a reflective diffractive grating and a first prism to form a first dispersion compensator in an intracavity optical path with the mode-locked laser to reduce dispersion in pulses of the laser output beam; and using the same reflective diffractive grating and a second prism to form a second dispersion compensator in an optical path of the amplified laser beam to reduce dispersion in pulses of the amplified laser beam.

These and other implementations are described in detail in the drawings, the description and the claims.

DETAILED DESCRIPTION

Figure 1:
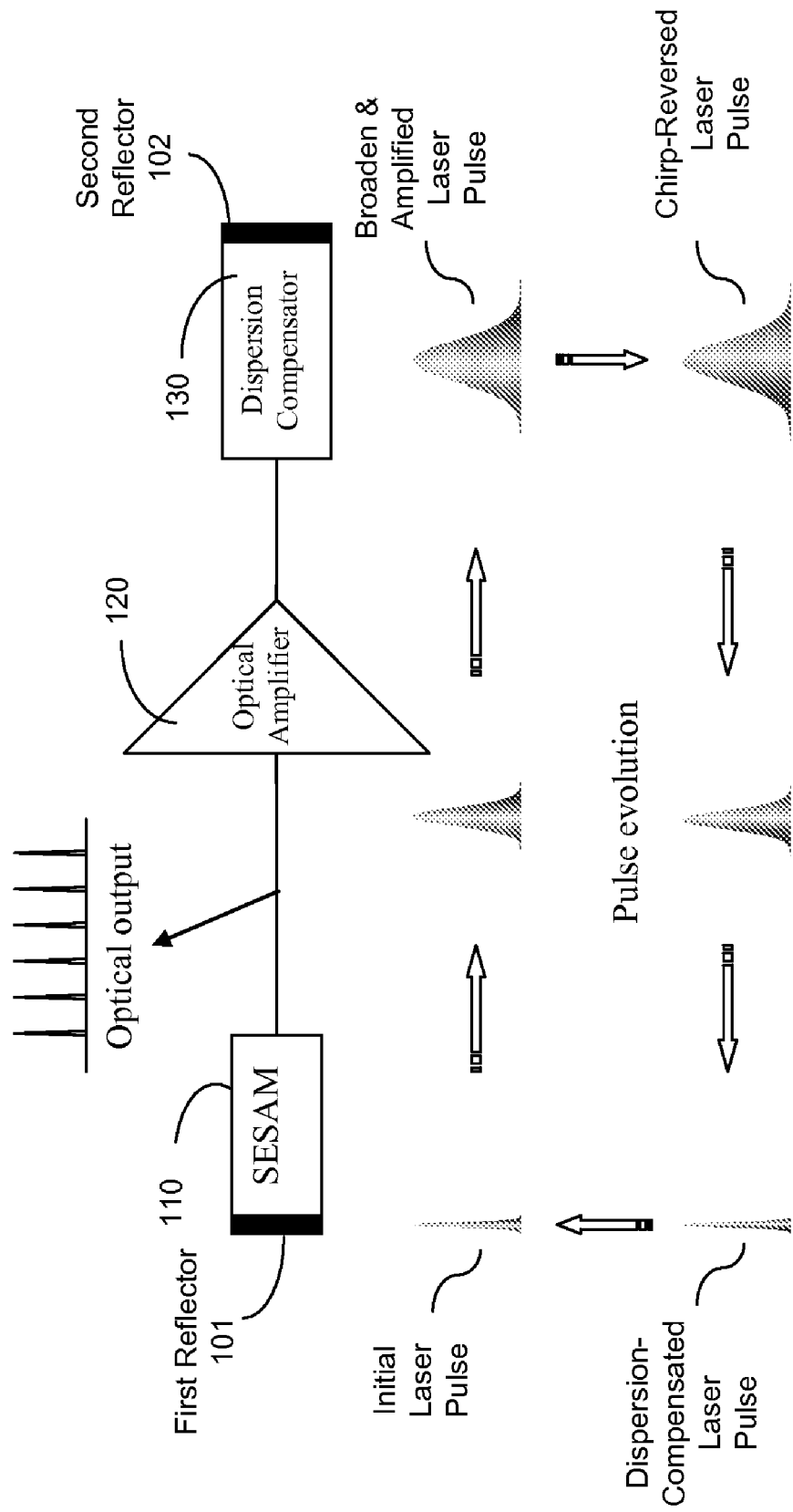
FIG. 1 illustrates an example of a mode-locked laser having a dispersion compensator and the pulse evolution in a round-trip within the laser.

Waveguiding silica fibers exhibit normal optical dispersion at the 1 µm wavelength region due to the large material dispersion of silica. To reduce the effect of the dispersion, the laser cavity for a mode-locked laser can be designed to include a dispersion compensator for stable mode-locking operation. Several approaches to dispersion compensation in such fiber lasers have been sought, such as a diffraction grating pair dispersion compensator, in-line chirped fiber Bragg grating, and photonic crystal fibers utilizing its anomalous dispersion property at 1 µm. These dispersion compensation techniques have certain technical or engineering limitations. For example, the diffraction grating pair tends to occupy a large space whereas the chirped fiber Bragg grating naturally disables a wide wavelength-tuning capability. Photonic crystal fibers have an intrinsic problem with splice loss when spliced to conventional silica fibers.

Wavelength tunability is highly desired in many applications such as spectroscopy, sensing, and biomedical applications. A tunable femtosecond pulsed fiber laser at 1 µm, can use two diffraction gratings and the final mirror angle adjustment for wavelength tuning. This tuning design tends to occupy large space and can cause instability in the laser cavity during wavelength tuning. Notably, the mirror used in this tuning design needs to reflect the beam exactly in the same incident path in order to avoid perturbation to the laser cavity. Therefore, once the dispersion compensator is aligned, the alignment should not be disturbed, especially in the mode-locking laser cavity. Changing the mirror position may lose the mode-locking condition, which is not a desirable configuration for commercial products.

High power pulse lasers can include a mode-locked fiber laser as the master-oscillator and a fiber optical amplifier coupled to the laser to amplify the laser output. In such a system, the fiber amplifier broadens the pulsewidth due to the normal dispersion in the fiber and, hence, an additional dispersion compensator is necessary in order to obtain a transform-limited pulse at the final output. Because the degree of dispersion compensation for the master-oscillator and the degree of dispersion compensation for the power amplifier tend to be different, separate dispersion compensators are needed to provide adequate dispersion compensation. If grating pair dispersion compensators are used in such a system, four diffraction gratings are needed and can cause the system to be bulky and occupy a large space. Many laser applications, however, require laser systems to be compact.

One of examples described in this application is an apparatus for wavelength-tunable femtosecond mode-locked fiber laser system. In this example, the laser system includes a wavelength-tunable master-oscillator and power amplifier, which adopts normally dispersive optical fibers and dispersion compensators. Only one single diffraction grating is provided for dispersion in both the laser and the amplifier and is shared for two dispersion compensators, which realizes a very compact high power femtosecond source at 1 µm. This system is a wavelength-tunable femtosecond pulsed master-oscillator power-amplifier (MOPA) fiber laser system, using a single reflective diffraction grating, which is simultaneously used for both dispersion compensators for the master-oscillator and the power amplifier. The dispersion compensator includes one shared reflective diffraction grating, two prisms, a knife-cutting aperture for wavelength tuning, and finally one shared mirror. The grating surface is divided into four regions, two of which are used for the master-oscillator and the other two are used for the power amplifier. This dispersion-compensating configuration can greatly reduce the required space to achieve a compact wavelength-tunable mode-locked MOPA system at 1 μm and is cost-effective since a diffraction grating with high quality tends to be expensive.

In the example described below, the wavelength-tunability is achieved by integrating a cutting-knife aperture (diaphragm) in the beam path at the dispersion compensating stage. Since the reflected beam from the grating surface has a linear incremental spectral distribution along the cross-sectional plane, the integrated cutting-knife aperture operates as a wavelength filter by transmitting the desired wavelength components while blocking the unwanted ones. By moving the aperture position in cross-sectional direction, the center wavelength of the output laser can be tuned. The optical bandwidth of the output laser can also be tuned by adjusting the aperture size of the diaphragm. Tests were conducted for various operating conditions for the aperture and the test results suggest that that if the hole size is too small or large, it can be difficult to achieve mode locking at certain wavelengths in the laser. Hence, the ability to adjust the aperture size is important for mode-locking at desired wavelengths.

In terms of wavelength tuning capability, the described dispersion compensator is easy to adjust the amount of compensated dispersion. Note that the dispersion compensation is a key factor for a stable femtosecond mode-locked fiber laser. In the examples described here, a prism's longitudinal position along the beam propagation direction or the longitudinal direction is adjusted to control the amount of compensated dispersion. This single element adjustment in adjust the dispersion compensation is simple to implement. A grating pair dispersion compensator can be difficult to adjust the amount of the dispersion compensation in part because the second grating and the final mirror must be moved simultaneously in order to keep the surfaces of two gratings in parallel position. Another feature of the described dispersion compensator in this application is that the optical path alignment is kept intact during the wavelength tuning procedure. In a grating pair dispersion compensator, the wavelength tuning is achieved by adjusting the final mirror angle and this adjustment causes the beam path misalignment both horizontally and even vertically. This beam path misalignment can cause a undesired change in the coupling efficiency from free space to the optical fiber, which is indeed a serious problem in mode-locked lasers. The described dispersion compensator in this application can be implemented to ensure the stable mode-locking operation during wavelength tuning.

FIG. 1 illustrates an example of a mode-locked laser having a dispersion compensator and the pulse evolution in a round-trip within the laser. Examples of mode-locked lasers described in this application are designed based on the laser layout in FIG. 1. The laser in FIG. 1 includes Fabry-Perot laser resonator formed by two reflectors 101 and 102. An optical gain medium 120 is placed in an optical path between the reflectors 101 and 102 as an intracavity element to provide optical pump and optical gain. The optical gain medium 120 can be implemented, for example, to include a doped fiber laser and an optical pump coupler that couples a pump laser beam at a pump wavelength into the doped fiber laser to produce an optical gain at a laser wavelength different from the pump wavelength. An optical saturable absorber 110 can be placed as an intracavity element inside the Fabry-Perot resonator to provide an saturable optical gain for passive mode locking. The optical saturable absorber 110 may be a semiconductor saturable absorber (SESA). The SESA 110 and the reflector 101 can be integrated together as a semiconductor saturable absorber mirror (SESAM). An externally controlled optical modulator may also be used to replace optical saturable absorber 110 to provide active mode locking so that the laser in FIG. 1 is an actively mode-locked laser. The dispersion compensation designs described here can be applied to both passively mode-locked lasers and actively mode-locked lasers.

A dispersion compensator 130 is included as an intracavity element within the Fabry-Perot resonator of the laser in FIG. 1 to negate the dispersion caused by the optical gain medium and other optical elements in the laser. FIG. 1 further shows the round-trip evolution of a laser pulse in the Febry-Perot resonator of the laser. The initial laser pulse illustrated in FIG. 1 is a laser pulse coming out of the saturable absorber 110 and is amplified by the optical gain medium 120. When the laser pulse reaches the other end (reflector 102) of the Fabry-Perot resonator, the laser pulse is broadened due to the normal dispersion in the optical gain medium 120 and other optical elements. In absence of the dispersion compensator 130, the pulse broadening would continue to increase as the laser pulse travels from the reflector 102 towards the reflector 101. The dispersion compensator 130 is designed to reverse the pulse chirp so that the pulse width of the laser pulse propagating from the reflector 102 to the reflector 101 decreases due to the normal dispersion in the optical gain medium 120 and other optical components. As a result, the pulse after one round trip in the Fabry-Perot resonator is a dispersion compensated laser pulse at the reflector 101.

In operation, once enough pump power is provided to the amplifier 120, the SESAM 110 starts mode-locking by filtering the spurious optical noise in the cavity. Then, when stably mode-locking is achieved, the pulsed laser changes its temporal shape periodically as shown by the pulse evolution diagram. Starting from the SESAM, the pulse gradually stretches due to normal dispersion in optical fiber and reach its longest pulse shape just before the dispersion compensator. The dispersion compensator reverses the chirp, keeping pulsewidth similarly. Because the chirp is now reversed, the normally dispersive optical fiber compresses the pulse and the pulse reaches its shortest shape at the SESAM. In the pulse evolution diagram, the amplitude change is omitted. The cavity loss is dominated by the reflections from the SESAM and the dispersion compensator, except for the output coupling. The pulse energy is larger before the pulse reaches the SESAM or the dispersion compensator than after being reflected.

Figure 2:
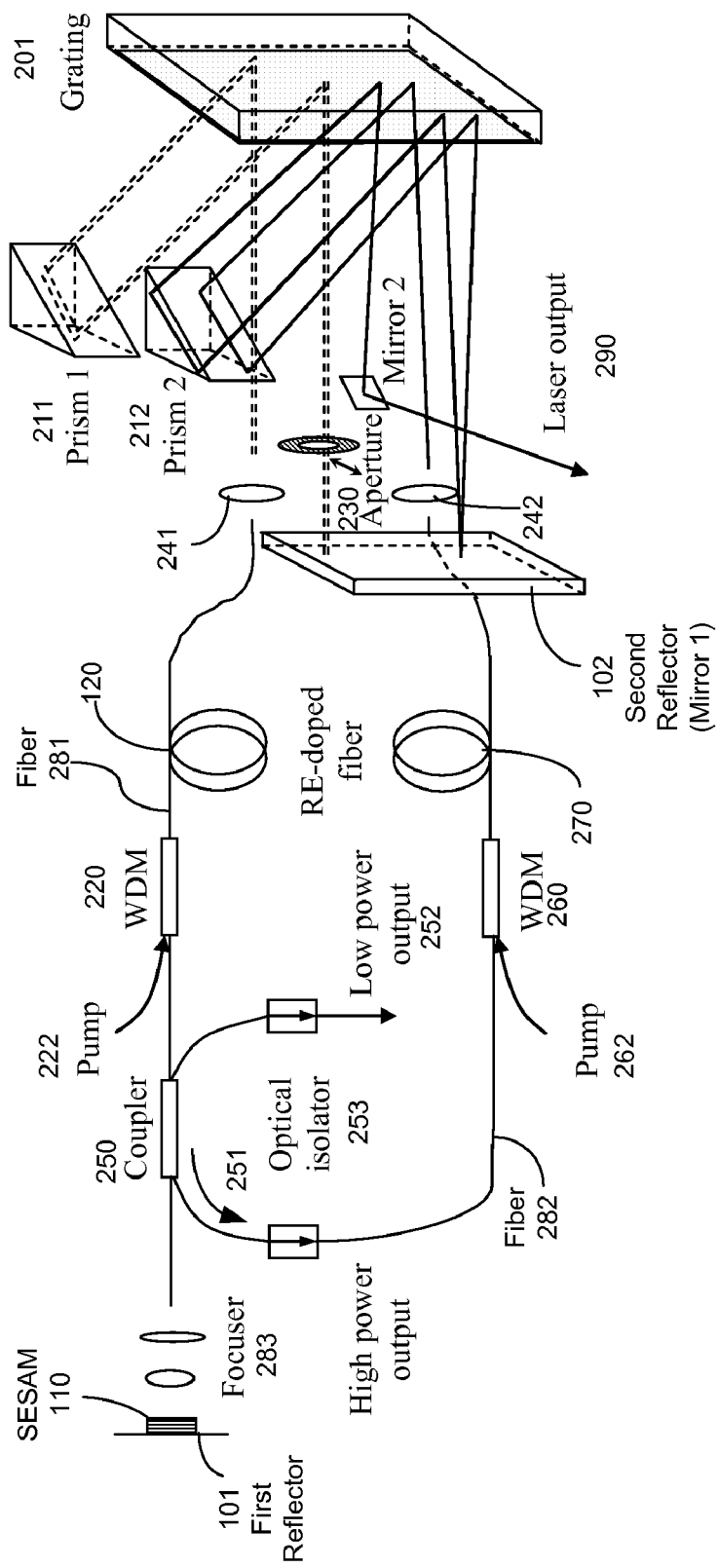
FIG. 2 shows an example of a laser system having a mode-locked laser and an external cavity optical amplifier that share a common diffraction grating for providing dispersion compensation for both the mode-locked laser and the optical amplifier.

FIG. 2 shows an example of a laser system having a mode-locked laser based on the laser design in FIG. 1 and an external cavity optical amplifier that share a common diffraction grating for providing dispersion compensation for both the mode-locked laser and the optical amplifier. The upper part of the FIG. 1 is the wavelength-tunable passively mode-locked fiber oscillator and the lower part of the FIG. 1 is a fiber power amplifier linked to the dispersion compensator. The oscillator includes a semiconductor saturable absorber mirror (SESAM), a pair of lens as a focuser 283, an output coupler 250, a pump coupler 220 which can be a wavelength-division multiplexer (WDM) that couples pump light into the laser and transmits the laser light, a rare-earth doped fiber as the gain medium 120, a lens 241 for collimating the light out of the fiber 120 and for coupling light into the fiber 120, and the wavelength-tuned dispersion compensator formed by a first prism 211, a diffraction grating 201 and the second reflector 102. The grating 201 the prism 211 and the reflector 102 form a folded optical configuration to allow laser light to retrace the same optical path between the reflectors 101 and 102. The output coupler 250 can be a fiber coupler which produces two optical outputs 251 and 252. The output 251 is a "high" power output because it is directed to the external cavity optical amplifier for amplification. A fiber 281 may be used to as part of the optical path inside the Fabry-Perot resonator and is coupled to the coupler 250.

The external cavity fiber amplifier in FIG. 2 includes a fiber 281 to receive the output 251 from the coupler 250 of the laser, a pump coupler 260 to receive and couple a pump beam into the fiber 282 (e.g., a WDM coupler to allow transmission of the laser light and to couple the pump light into the fiber), a rare-earth doped fiber 270, and a lens 242 for collimating the amplified laser output from the doped fiber 270. The dispersion compensator for the optical amplifier includes the shared diffraction grating 201, a second separate prism 212 and the second reflector 102 shared with the laser. The diffraction grating 201, the second separate prism 212 and the second reflector 102 form another folded optical configuration to allow the amplified laser output beam originated from the laser output 251 to travel along different optical paths from the intracavity laser beam in the Fabry-Perot resonator of the laser. Different from the dispersion compensator for the laser where the laser light retraces its optical path in two propagating directions, the prism 212 of the dispersion compensator for the optical amplifier is oriented to direct the amplified laser output beam to travel along two different optical paths that are shifted from each other vertically when being directed to the grating 201 for the first time by the lens 242 and for the second time by the reflector 102. An output mirror (Mirror 20) is provided to direct dispersion-compensated and amplified laser output beam out of the amplifier's dispersion compensation module formed by the diffraction grating 201, the second separate prism 212 and the second reflector 102 to produce the laser output 290 for the system.

In one implementation, the laser can include an aperture 230 located between the reflector 102 and the grating 201 to spatially filter the intracavity laser light within the Fabry-Perot resonator to control and tune (1) the center wavelength of the laser light and (2) the optical bandwidth of the laser light. As an option, a second aperture may also be placed in an optical path of the amplified laser output beam between the second reflector 102 and the grating 201 to control and tune (1) the center wavelength of the amplified laser output beam 290 and (2) the optical bandwidth of the amplified laser output beam 290.

In FIG. 2, the two dispersion compensators for the master-oscillator and the amplifier share the single grating 201 and the reflector 102 (Mirror 1) which is one end of the Fabry-Perot resonator of the laser. The prism 211 is located in the upper space whereas the prism 212 is located in the lower space. The horizontal positions for two prisms 211 and 212 can be different because the amounts of dispersion compensation for the oscillator and the amplifier are usually different. The reflective surface of the reflector 102 and the reflective surface of the grating 201 are divided vertically. The dispersion compensator for the master-oscillator uses the upper space whereas that for the fiber amplifier uses the lower space. The beam path for the intracavity laser light in the dispersion compensator of the master-oscillator is as follows: collimating lens 241, the left-upper side of the grating surface of the grating 201, the right surface of prism 211 which reflects the beam by the total internal reflection mechanism, the left surface of prism 211, the right-upper side of the grating surface of the grating 201, a knife-cutting aperture (a diaphragm) 230 for wavelength-tuning, and the reflector 102 (Mirror 1). The reflected beam for the intracavity laser light from the reflector 102 follows the same backward path and couples to the fiber again.

The beam path of the amplified laser beam 290 for the amplifier dispersion compensator is different. Firstly, the beam path of the amplified laser beam 290 has a nonzero vertical angle so that the existing beam from the dispersion compensator has a higher vertical position than the collimating lens 242. This design is provided to extract the output laser 290. The forward and the backward beam path for the amplified laser beam 290 may appear to be overlap with each other if viewed from the top and this configuration is used to ensure the horizontal beam paths are the same for producing linear dispersion compensation. If these horizontal beam paths were different, the induced dispersion would have non-linear characteristics. The forward beam path for the amplified laser beam 290 is as follows: the collimating lens 242, the lower-left side of grating surface of the grating 201, the right surface of prism 212, the left surface of prism 212, the lower-right side of grating surface of the grating 201, and the reflector 102. The backward path of the amplified laser beam 290 has the same horizontal paths, but with a nonzero vertical angle.

Rendering two dispersion compensators to share a single grating and a common reflecting mirror, the required space now has been greatly reduced. In comparison with a typical grating pair dispersion compensator, each designed dispersion compensator already occupies only the quarter area. By sharing the almost same (but vertically separate) space, the invented system requires only one eighth (⅛) space of what was required by the two separate dispersion compensators, using four different gratings.

Figure 3:
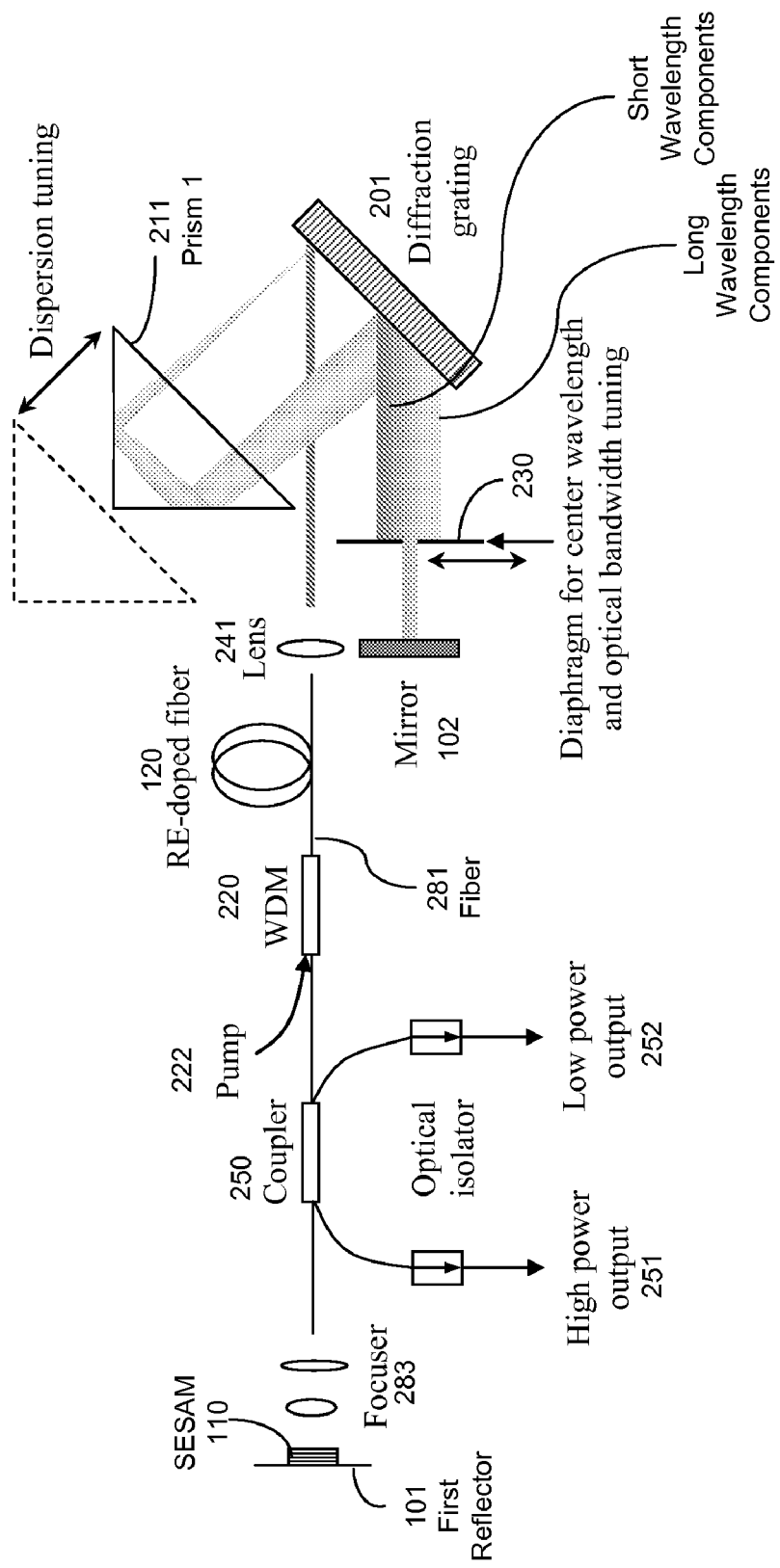
FIG. 3 shows the mode-locked laser and its dispersion compensation based on the commonly shared diffraction grating in FIG. 2.

FIG. 3 shows the schematic of the master-oscillator for the laser in FIG. 2. In order for easy self-starting of mode-locking, a lens-pair focuser is used to reduce down the spot size on SESAM. The coupler 250, which can be a fiber optical splitter or coupler with four terminals, is integrated for laser output. The coupling ratio may vary typically from 5% to 50% for stable mode-locking. The left leg of the coupler 250 provides a high power laser output with transform limited pulse, provided that the lead fiber length is adjusted whereas the right leg of the coupler 250 emits a low power laser with chirped pulse. The low power output 252 can be used to monitor the mode-locking performance of the master-oscillator. In order to prevent any perturbation in the laser cavity, such as spurious back-reflection from the outputs, both output ends can be connected to optical isolators 253. The WDM coupler 220 provides the pump at 980 nm to the amplifying rare-earth doped fiber.

The dispersion compensator uses a free space configuration. The operation for dispersion compensation in FIG. 2 is to utilize the light path difference between the long and the short wavelength components, by adopting a single diffraction grating 201 and a prism 212 to achieve a simplified structure and to reduce alignment difficulty. The prism reverses the input image to the output. The amount of compensated dispersion is governed by the longitudinal position of the prism. The longitudinal position of the prism along the beam direction can be changed to tune the amount of dispersion compensation. The prism itself is dispersive but the amount of the prism dispersion is negligible compared to the dispersion induced by the optical fibers and the dispersion compensator, if optical fiber is long enough, say, larger than 1 m in total. Typically, the amount of dispersion compensation should match the dispersion induced by the optical fibers, resulting in a near zero net cavity dispersion, for stable mode-locking. Generally, if the overall cavity dispersion is normal, the resulting laser pulse becomes parabolic whereas it becomes a soliton when the overall dispersion is anomalous.

In operation, the prism 211 reflects the beam via the total internal reflection mechanism from the right side surface of the prism 211 to hit the left surface of the prism. Then, also by the total internal reflection mechanism, the beam is reflected by the prism 211 and the reflector 102 back to the diffraction grating surface. The reflected beam from the second hitting surface of the diffraction grating 201 has spatial distribution of optical components. In particular, the optical components are spatially distributed from shorter to longer wavelengths, from upper side to lower side as shown in FIG. 3. The aperture or diaphragm 230 is used to select desired wavelength components by blocking unwanted ones. Note that if the aperture size changes, the optical bandwidth of the transmitted light also changes. The beam transmitted by the aperture 230 is now reflected back from the mirror 102, to follow the same reverse paths as the before.

Once the mirror 102 is well aligned to provide the maximum back-coupling efficiency to the fiber without the diaphragm 230, it is not necessary to adjust the alignment after inserting the diaphragm 230. The free space system is still well aligned even if the diaphragm 230 changes its position to select the center wavelength, or its hole size to change the optical bandwidth.

Figure 4:
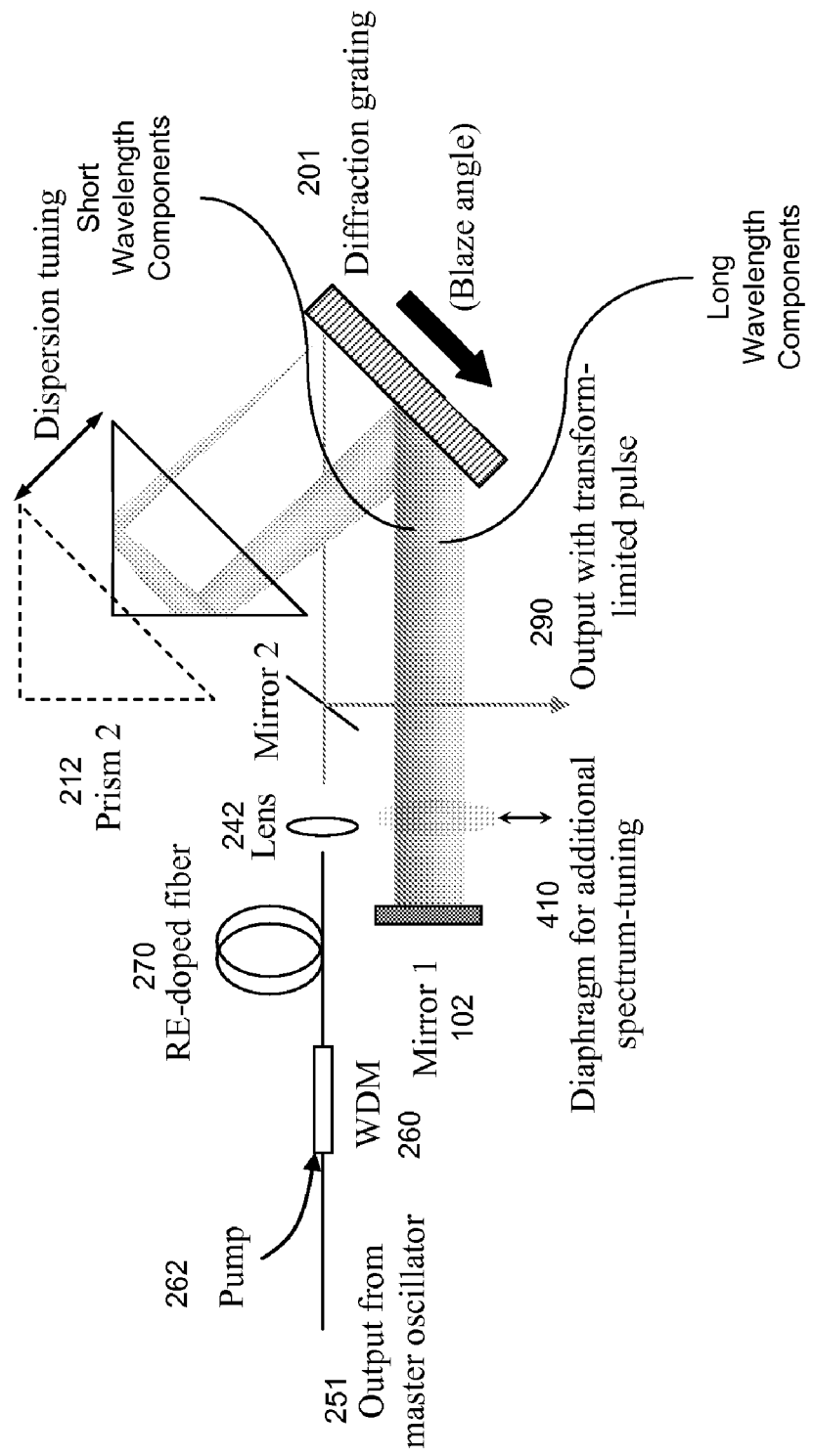
FIG. 4 shows the optical amplifier and its dispersion compensation based on the commonly shared diffraction grating in FIG. 2.

FIG. 4 shows the schematic of the power amplifier and the dispersion compensator in the laser in FIG. 3. This part of the laser is to amplify the generated mode-locked source from the master-oscillator and to compensate the chirp in order to generate a transform-limited short pulse in the output beam 290. In some implementations, the rare-earth doped fiber 270 used in the amplifier may be the same fiber as the master-oscillator. In other implementations, the doped fiber length may be much longer than the master-oscillator since the pump power for the amplifier should be larger than that for the master-oscillator in various applications.

Due to the normal dispersion in the amplifier fiber, the pulse broadens temporally and spectrally. In the mean time, the self-phase modulation, the normal dispersion of the fiber, and the gain cooperate to generate a parabolic pulse, which has strictly linear chirp over the entire optical spectrum of the pulse. The induced linear chirp is removed through the dispersion compensator, resulting in a near transform-limited pulse. Therefore, the amount of dispersion compensation should exactly match the chirp from the amplifier output pulse.

The beam path in the dispersion compensator is in following order: the lens 242, the shared diffraction grating 201, prism 212, the diffraction grating 201, mirror 102, diffraction grating 201, prism 212, diffraction grating 201, and finally mirror 2. The collimated beam from the lens 242 should have a nonzero vertical angle so that it directs slightly upwards. Then, the forward beam path from the lens 242 to the mirror 102 is vertically off-set from the backward beam path from the mirror 102 to the mirror 2. Hence, the vertical position of the mirror 2 should be higher than the lens 242 in this example.

Similarly to the master-oscillator, the longitudinal position of the prism 212 is adjusted to vary the amount of the dispersion on the output beam 290. The position of the prism 212 can be adjusted to obtain a pulse with a certain desired pulsewidth, which should be longer than the obtainable transform-limited pulse.

In some implementations, a diaphragm or aperture 410 can be placed in front of the mirror 102 for wavelength-tuning at this dispersion compensator stage. When the amplified output pulse has a broadband flat-top optical spectrum with linear chirp (parabolic pulse), the diaphragm or aperture 410 can be used to function as a band-pass filter to select the desired wavelength components in the broadband spectrum. In this context, this aperture 410 allows strictly transform-limited short pulse at a desired wavelength. When the chirp is linear, the diaphragm's position and aperture size can be adjusted to achieve a desired center wavelength and a optical bandwidth. Then, a transform-limited pulse is generated, at a desired center wavelength and with a desired pulsewidth, which is determined by the passing bandwidth from the aperture 410.

Therefore, the wavelength-length tuning can be achieved at either master-oscillator stage or the final dispersion compensator stage. The features in the above example shown in FIGS. 2-4 allow an easy alignment of the degree of dispersion compensation, reduces the component counts as well as the required space, and provide a compact wavelength-tunable high power mode-locked femtosecond pulse system.

A prototype laser based on the design in FIGS. 2-4 was built and tested. We built a polarization maintaining (PM) laser cavity, using PM passive fibers and a PM rare-earth doped fiber. The PM laser cavity is more convenient for commercial products since non-PM cavity always needs manual polarization adjustment for stable operation. The inserted output coupler (thin film in-line output coupler, Novawave) is made such that only the slow axis can be transmitted, which plays a role of polarizer. Therefore, all the light in the cavity is in the slow-axis polarization state.

We used PM 980 (OFS) fiber for passive optical fibers. An Yb-doped PM fiber (Yb500, INO) is used for the amplifying medium, which has a nominal 490 dB/m unsaturated core absorption at 976 nm. The used Yb-doped fiber length for the master-oscillator was 1.2 m whereas that for the power-amplifier was 2.5 m. A multi-quantum-well structured SESAM with 35% absorbance was used for the self-start of the mode-locking. The SESAM has also a multi-layered structure for broadband Bragg reflection with the reflection band of 1020-1080 nm. The measured modulation depth was 27% and the recovery time was less than 10 ps. The focuser consisted in a lens pair, with a focal length of 11 mm and 4.5 mm, resulting in a 41% spot size reduction from the original beam size in the PM 980 fiber (OFS), which has a mode-field diameter of 5.8 µm at 1060 nm. An output coupler with output coupling ratio of 5% was used to extract the output laser beam from the cavity. For the optical pump, we used a 976 nm JDSU fiber pigtailed laser diode for the master-oscillator, which can reach 200 mW fiber coupled power, and a 976 nm EM4 fiber pigtailed laser diode for the power amplifier, which can reach 600 mW. A thin-film WDM coupler was used for pump coupling. The transmission band is specially designed for broadband tuning, namely, 1030-1080 nm. Over this entire transmitting band, the variation of the transmittance is within 0.5 dB.

For the dispersion compensator, a collimating lens with a focal length of 11 mm is used. Then, the collimated beam diameter was approximately 2.5 mm. A reflective diffraction grating with 600 grooves/mm, blazed at 1 µm (Newport) is used. The size of grating surface was 30 mm×30 mm. The beam incident angle to the normal of the grating surface was 28°. A rectangular prism with the side surface dimension of 20 mm×20 mm was used. The beam was hitting the diagonal surface of the prism with a near zero angle to the surface normal. The material of the prism is BK7 (refractive index 1.50669 at 1060 nm), ensuring total internal reflection with an incident angle larger than 41°. In fact, no external transmitting light at the prism surface was observed, asserting the total internal reflection angle is kept in the experiment. The final mirror was a gold-coated broadband mirror with the reflectivity larger than 97% in the entire optical spectrum of interest. We adopted a diaphragm for wavelength tuning, which allows the aperture size adjustment from near 0 to 20 mm diameter. In the experiment, an aperture size of 5 mm showed the widest tunability and the best stability. Then, we fixed the diaphragm on a linear stage so that the cross-sectional position of the aperture can change for wavelength tuning. Hence, the transmitting light from the diaphragm can be varied in the center wavelength as well as the optical bandwidth. For final output coupling mirror, a gold-coated mirror with a half inch diameter was used.

Figure 5:
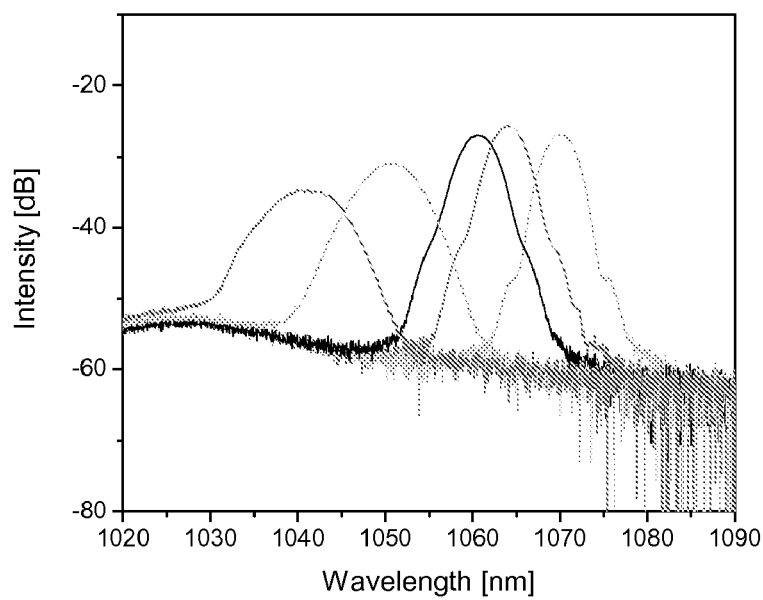
FIG. 5 shows measured optical spectra of a wavelength-tuned mode-locked master-oscillator based on the design in FIG. 2.

FIG. 5. Optical spectra of wavelength-tuned mode-locked master-oscillator.

The total fiber length in the cavity was 4 m. When the dispersion (D of both the PM 980 and Yb 500 fiber is −50 ps/nm/km at 1060 nm, the dispersion induced by the fiber is calculated as −0.20 ps/nm. In order to compensate the same amount, we place the prism 1 at 62 mm away from the grating surface. This corresponds to +0.21 ps/nm, which is slightly larger than the fiber dispersion. Still, the net cavity dispersion results in a near zero, which realizes a stable self-starting mode-locked fiber laser. The wavelength-tuning range of the master-oscillator was 1040-1070 nm.

FIG. 5 shows the optical spectra of the mode-locked master-oscillator output pulse, for various wavelengths. Each optical spectrum for a specific center wavelength shows a near Gaussian optical spectrum, which indicates that the net cavity dispersion is near zero. If we set the net cavity dispersion as normal (shorter distance between the prism and the grating), the pulse became parabolic with flat-top shape whereas the pulse became a soliton when the cavity dispersion is anomalous (longer distance between the prism and the grating). In the figure, the shorter wavelengths tend to have wider optical spectrum than the longer wavelengths. We fixed our aperture size to 5 mm diameter during wavelength-tuning and the optical spectrum at the aperture position has such a spatial distribution that the shorter wavelength components are more densely populated than the longer wavelength. Therefore, if we fix the aperture size, the shorter wavelength laser tends to have wider optical bandwidth. However, one can always change the aperture size for desired optical bandwidth of the output pulse.

The master-oscillator started mode-locking automatically with the pump power range of 30-40 mW and at the fundamental repetition rate of 22.5 MHz. Above this range of pump power, the master-oscillator harmonically mode-locked, with the repetition rate such as 45 MHz, 67.5 MHz, and so on. When the pump power was between 30-40 mW, The wavelength was continuously tunable without disturbing the mode-locking condition. The output power varied between 40 μW (at 1040 nm) to 120 μW (at 1060 nm) when the pump power was 40 mW, which is mostly caused by the wavelength-dependent insertion loss of the used optical isolator.

Figure 6:
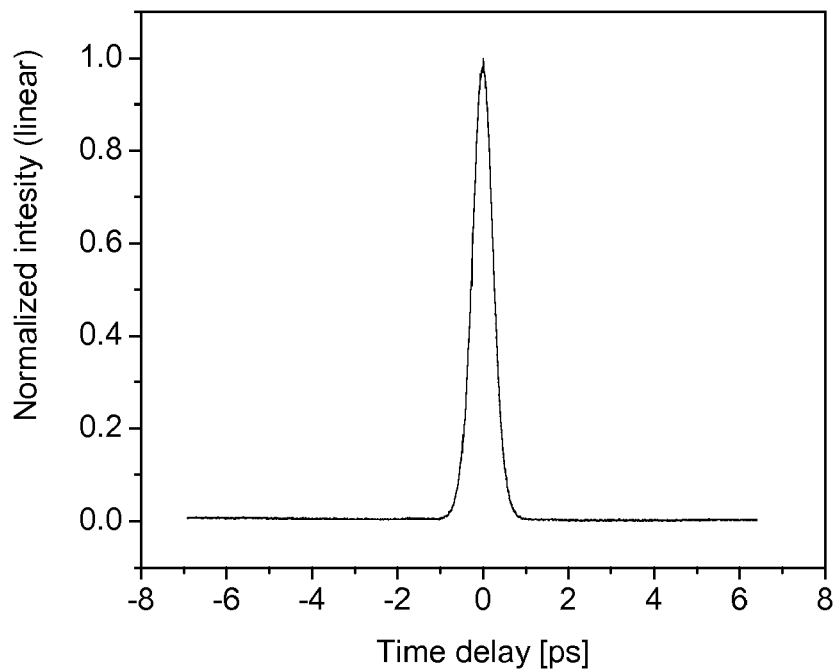
FIG. 6 shows an autocorrelation trace of an output from the master-oscillator in FIG. 5.

FIG. 6 shows the measured autocorrelation trace of the master-oscillator (from the high power output port) when the wavelength is tuned to 1064 nm. If an ideal Gaussian pulse is assumed, the pulsewidth is 390 fs (full-width half-maximum). The pulse is measured at 2.2 m of the output coupling fiber length from the coupler.

Figure 7A:
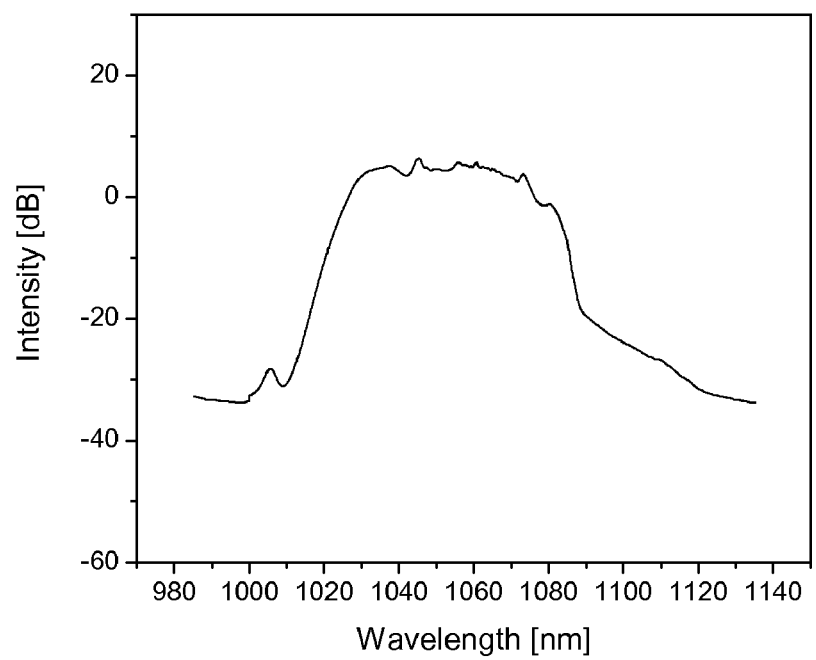
FIGS. 7A and 7B show characteristics of (A) optical spectrum and (B) the autocorrelation trace of the amplified pulse at maximum power output from the master-oscillator in FIG. 5.
Figure 7B:
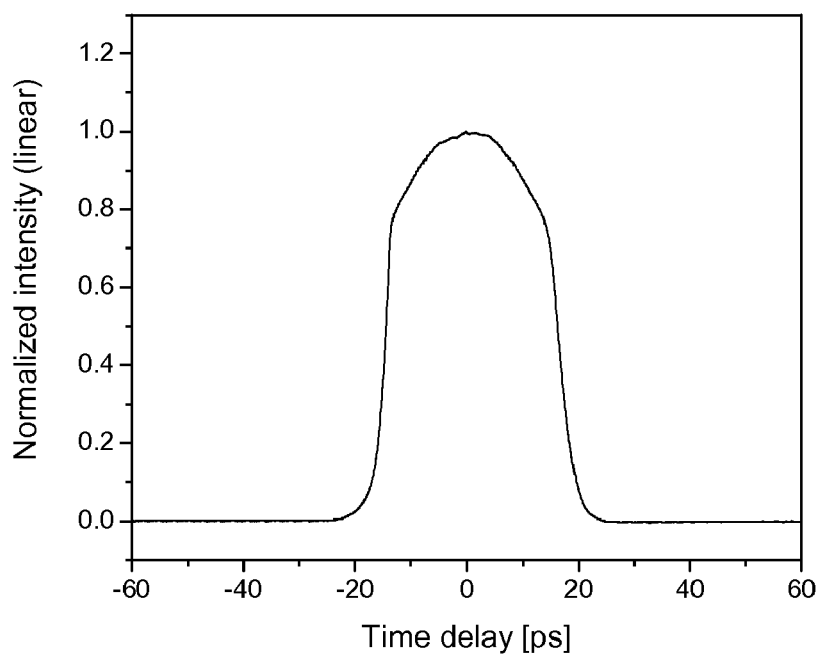
Figure 8A:
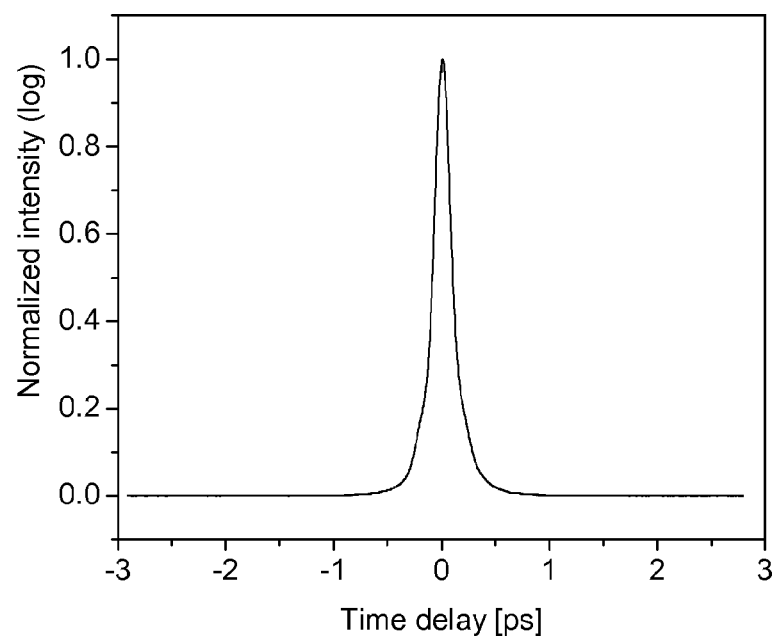
FIGS. 8A and 8B show autocorrelation traces of the dispersion-compensated chirp free pulse in (A) a linear Y-axis scale and (B) a logarithmic Y-axis scale.
Figure 8B:
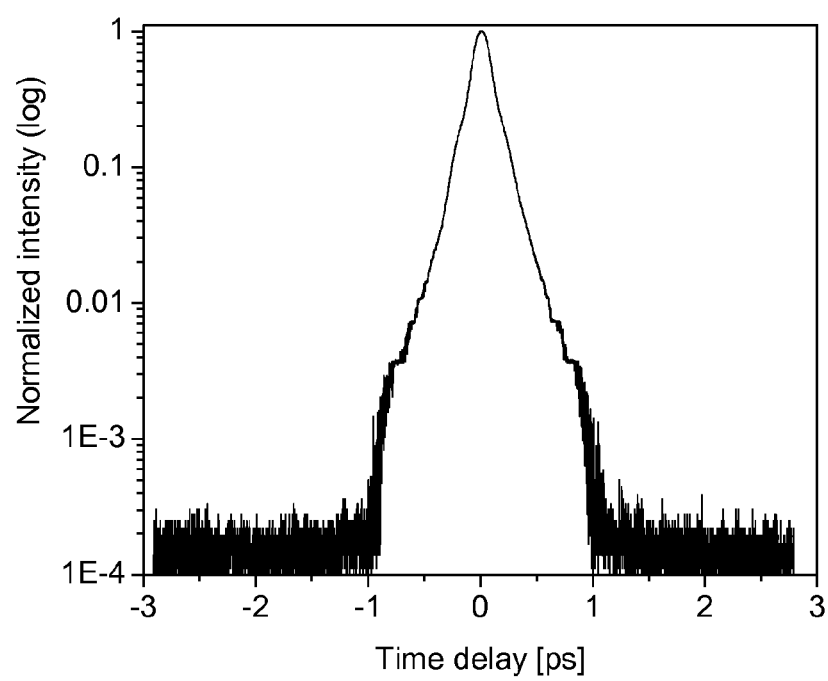

FIGS. 7A and 7B show the measured optical spectrum and the autocorrelation of the amplified output where the amplified output power reached 240 mW. The autocorrelation trace and the optical spectrum show in FIGS. 7A, 7B, 8A and 8B clearly indicate that the amplified pulse is parabolic with a linear chirp. The dispersion compensator for the amplifier induced a loss, due to the diffraction grating efficiency, surface back-reflection from the uncoated prism, and the mirror 102. We have obtained 150 mW transform limited pulse after the dispersion compensator. FIGS. 8A and 8B show the chirp-free pulse from the dispersion compensator. The measured pulsewidth is 105 fs if an ideal Gaussian pulse is assumed. The above designs can be used to build a compact wavelength-tunable mode-locked master-oscillator and power-amplifier fiber laser system. The prototype system was tested to be wavelength-tunable in the range of 1040-1070 nm continuously without losing mode-locking condition. The generated femtosecond pulse reached an average power of 150 mW with 105 fs pulsewidth (FWHM) at 22.5 MHz repetition rate.

While this specification contains many specifics, these should not be construed as limitations on the scope of an invention that is claimed or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. For example, the described dispersion compensation designs for the laser and the amplifier may be separated implemented as shown in FIGS. 3 and 4, respectively, without being in the combination shown in FIG. 2.

Only a few examples and implementations are described. Other implementations, variations, modifications and enhancements to the described examples and implementations may be made.

What is claimed is:

1. An optical device, comprising:
   a Fabry-Perot resonator comprising a first optical reflector, a reflective diffraction grating, a first prism, and a second optical reflector,
   wherein the diffraction grating and the first prism are located in an optical path between the first and second optical reflectors to direct light from the first optical reflector to the second optical resonator and vice versa, and
   wherein the diffraction grating is positioned to direct light from the first optical reflector at a first location on the diffraction grating to the first prism and the first prism reflects the light back to a second location on the diffraction grating which directs the reflected light from the first prism to the second reflector which is oriented to reflect the light back to the diffraction grating to retrace an optical path from the first optical reflector to the second optical reflector via the diffraction grating and the first prism;
   an optical saturable absorber unit located in the optical path between the first and second optical reflectors of the Fabry-Perot resonator;
   a first optical gain medium located in the optical path between the first and second optical reflectors of the Fabry-Perot resonator, wherein the optical grain medium absorbs pump light at a pump wavelength to emit laser light at a laser wavelength different from the pump wavelength and produces an optical gain at the laser wavelength;

a first optical coupler located in the optical path between the first and second optical reflectors of the Fabry-Perot resonator to couple the pump light into the Fabry-Perot resonator to cause the optical gain medium to emit the laser light;

a second optical coupler located in the optical path between the first and second optical reflectors of the Fabry-Perot resonator to couple a portion of the laser light in the Fabry-Perot resonator out of the Fabry-Perot resonator as a laser output beam;

an optical amplifier placed in an optical path of the laser output beam to amplify power of the laser output beam;

an optical element to direct the laser output beam from the optical amplifier to the diffraction grating which directs the laser output beam along a first optical path; and a second prism located in the first optical path to receive the laser output beam from the diffraction grating and operable in combination with the diffraction grating and the second optical reflector to direct the laser output beam, sequentially, from the second prism to the diffraction grating, from the diffraction grating to the second optical reflector, from the second optical reflector to the diffraction grating, from the diffraction grating to the second prism, from the second prism to the diffraction grating which further directs the laser output beam along a second optical path.

2. The device of claim 1, wherein:
the optical saturable absorber unit is integrated to the first optical reflector.

3. The device of claim 2, wherein:
the optical saturable absorber unit comprises a semiconductor saturable absorber.

4. The device of claim 1, wherein:
the first optical gain medium comprises a segment of doped fiber,
the first optical coupler is a first fiber coupler coupled to the doped fiber.

5. The device of claim 1, comprising:
an optical aperture located in an optical path between the second optical reflector and the diffraction grating to spatially filter light between the first and second optical reflectors within the Fabry-Perot resonator to select a wavelength of the laser light within a gain spectral range of the first optical gain medium.

6. The device of claim 5, wherein:
the optical aperture is adjustable in position to tune a center wavelength of the laser light.

7. The device of claim 6, wherein:
the center wavelength of the laser output beam is in a spectral range from 1040 nm to 1070 nm.

8. The device of claim 6, wherein:
the center wavelength of the laser output beam is in a spectral range from 1030 nm to 1080 nm.

9. The device of claim 6, wherein:
the center wavelength of the laser output beam is in a spectral range around 1 micron.

10. The device of claim 5, wherein:
the optical aperture is adjustable in size to control a spatial width of the laser light passing through the optical aperture to adjust a spectral bandwidth of the laser light.

11. The device of claim 1, wherein:
the first prism is spaced from the diffraction grating by a first distance based on an amount of dispersion in the laser light to reduce the dispersion in the laser light.

12. The device of claim 1, wherein:
the second prism is spaced from the diffraction grating by a second distance based on an amount of dispersion in the laser output beam after passing through the optical amplifier to reduce the dispersion in the laser output beam.

13. The device of claim 12, wherein:
the laser output beam is at a wavelength in a spectral range around 1 micron.

14. The device of claim 12, wherein:
the laser output beam is at a wavelength in a spectral range from 1030 nm to 1080 nm.

15. The device of claim 12, wherein:
the laser output beam is at a wavelength in a spectral range from 1040 nm to 1070 nm.

16. The device of claim 12, comprising:
an optical aperture located in an optical path between the second optical reflector and the diffraction grating to spatially filter the laser output beam between the second optical reflector and the diffraction grating to control a wavelength of the output laser beam with a bandwidth of the laser light.

17. The device of claim 16, wherein:
the optical aperture is adjustable in position to tune a center wavelength of the laser light.

18. The device of claim 16, wherein:
the optical aperture is adjustable in size to control a spatial width of the laser output passing through the optical aperture to adjust a spectral bandwidth of the laser output beam.

19. A method for compensating optical dispersion in light, comprising:
directing light into a first location of a reflective diffractive optical grating to reflect the light;
using a prism spaced from the reflective diffractive optical grating, to receive the reflected light from the first location on the diffractive optical grating along a first optical path from the first location of the diffractive optical grating to the prism and to reflect the received light back to a second, different location on the diffractive optical grating along a second, different optical path from the diffractive optical grating to the second location of the diffractive optical grating; and
using a reflector to reflect the light coming from the second location of the diffractive optical grating back to the second location on the diffractive optical grating to direct the light from the second location on the diffractive optical grating to the prism and back to the second location on the diffractive optical grating, subsequently to the prism and to the first location of the diffractive optical grating again to produce output light which has reduced dispersion.

20. The method as in claim 19, comprising:
controlling a distance between the prism and the diffractive optical grating to control an amount of correction to the dispersion in the output light.

21. The method as in claim 19, comprising:
spatially filtering light at a location between the diffractive optical grating and the reflector to control a center wavelength in the output light.

22. The method as in claim 19, comprising:
spatially filtering light at a location between the diffractive optical grating and the reflector to control a bandwidth in the output light.

23. An optical device, comprising:
a Fabry-Perot resonator comprising a first optical reflector, a reflective diffraction grating, a first prism, and a second optical reflector,
   wherein the diffraction grating and the first prism are located in an optical path between the first and second optical reflectors to direct light from the first optical reflector to the second optical resonator and vice versa, and
   wherein the diffraction grating is positioned to direct light from the first optical reflector at a first location on the diffraction grating to the first prism and the first prism reflects the light back to a second location on the diffraction grating which directs the reflected light from the first prism to the second reflector which is oriented to reflect the light back to the diffraction grating to retrace an optical path from the first optical reflector to the second optical reflector via the diffraction grating and the first prism;
an optical mode locking unit located in the optical path between the first and second optical reflectors of the Fabry-Perot resonator to provide a mode locking mechanism;
a first optical gain medium located in the optical path between the first and second optical reflectors of the Fabry-Perot resonator, wherein the optical grain medium absorbs pump light at a pump wavelength to emit laser light at a laser wavelength different from the pump wavelength and produces an optical gain at the laser wavelength;
a first optical coupler located in the optical path between the first and second optical reflectors of the Fabry-Perot resonator to couple the pump light into the Fabry-Perot resonator to cause the optical gain medium to emit the laser light; and
a second optical coupler located in the optical path between the first and second optical reflectors of the Fabry-Perot resonator to couple a portion of the laser light in the Fabry-Perot resonator out of the Fabry-Perot resonator as a laser output beam.

24. The device of claim 23, wherein:
the optical mode locking unit is a saturable absorber to provide passive mode locking.

25. The device of claim 23, wherein:
the optical mode locking unit is an externally controlled optical modulator to provide active mode locking.

26. The device of claim 23, comprising:
an optical aperture located in an optical path between the second optical reflector and the diffraction grating to spatially filter light between the first and second optical reflectors within the Fabry-Perot resonator to select a wavelength of the laser light within a gain spectral range of the first optical gain medium.

27. The device of claim 26, wherein:
the optical aperture is adjustable in position to tune a center wavelength of the laser light.

28. The device of claim 27, wherein:
the center wavelength of the laser output beam is in a spectral range from 1040 nm to 1070 nm.

29. The device of claim 27, wherein:
the center wavelength of the laser output beam is in a spectral range from 1030 nm to 1080 nm.

30. The device of claim 27, wherein:
the center wavelength of the laser output beam is in a spectral range around 1 micron.

31. The device of claim 26, wherein:
the optical aperture is adjustable in size to control a spatial width of the laser light passing through the optical aperture to adjust a spectral bandwidth of the laser light.

32. The device of claim 23, wherein:
the first prism is spaced from the diffraction grating by a first distance based on an amount of dispersion in the laser light to reduce the dispersion in the laser light.

33. The device as in claim 23, comprising:
an optical amplifier placed in an optical path of the laser output beam to amplify power of the laser output beam;
an optical element to direct the laser output beam from the optical amplifier to the diffraction grating which directs the laser output beam along a first optical path; and
a second prism located in the first optical path to receive the laser output beam from the diffraction grating and operable in combination with the diffraction grating and the second optical reflector to direct the laser output beam, sequentially, from the second prism to the diffraction grating, from the diffraction grating to the second optical reflector, from the second optical reflector to the diffraction grating, from the diffraction grating to the second prism, from the second prism to the diffraction grating which further directs the laser output beam along a second optical path.

34. An optical device, comprising:
an optical amplifier placed in an optical path of a laser beam to amplify power of the laser beam;
a reflective diffraction grating positioned to receive the laser beam from the optical amplifier and to reflect, at a first location of the reflective diffraction grating, the received laser beam along a first optical path;
an optical reflector placed in an optical path of the laser beam reflected from the reflective diffraction grating to reflect the laser beam back to the reflective diffraction grating; and
a prism located in the first optical path to receive the laser beam reflected from the diffraction grating and operable in combination with the diffraction grating and the optical reflector to direct the laser beam, sequentially, from the prism to a second location on the diffraction grating, from the diffraction grating to the optical reflector, from the optical reflector to the diffraction grating, from the diffraction grating to the prism, from the prism to the diffraction grating which further directs the laser beam along a second optical path with a reduced level of dispersion in comparison with the laser beam output by the optical amplifier.

35. The device of claim 34, comprising:
an optical aperture located in an optical path between the optical reflector and the diffraction grating to spatially filter the laser beam between the optical reflector and the diffraction grating to control a wavelength of the laser beam along the second optical path within a bandwidth of the laser beam from the optical amplifier.

36. The device of claim 35, wherein:
the optical aperture is adjustable in position to tune a center wavelength of the laser light.

37. The device of claim 35, wherein:
the optical aperture is adjustable in size to control a spatial width of the laser output passing through the optical aperture to adjust a spectral bandwidth of the laser output beam.

38. A method for providing dispersion compensation in both a mode-locked laser and an optical amplifier for the mode-locked laser, comprising:
  directing a laser output beam from a mode-locked laser to pass through an optical amplifier to amplify the laser output beam and to produce an amplified laser beam;
  using a reflective diffractive grating and a first prism to form a first dispersion compensator in an intracavity first optical path with the mode-locked laser to reduce dispersion in pulses of the laser output beam;
  using the same reflective diffractive grating and a second prism to form a second dispersion compensator in a second optical path of the amplified laser beam to reduce dispersion in pulses of the amplified laser beam; and
  wherein first optical path is different of second optical path and first optical path and second optical path are not overlapping.

* * * * *

UNITED STATES PATENT AND TRADEMARK OFFICE
CERTIFICATE OF CORRECTION

PATENT NO. : 7,573,918 B1 Page 1 of 1
APPLICATION NO. : 11/835301
DATED : August 11, 2009
INVENTOR(S) : Daniel Beom Soo Soh and Anthony Hong Lin It is certified that error appears in the above-identified patent and that said Letters Patent is hereby corrected as shown below:

In the claims:

In claim 1, column 12, line 66, please delete "grain" and insert --gain--.

In claim 23, column 15, line 26, please delete "grain" and insert --gain--.

Signed and Sealed this

First Day of June, 2010

David J. Kappos
*Director of the United States Patent and Trademark Office*